US008864855B2

(12) United States Patent
Zimmermann

(10) Patent No.: US 8,864,855 B2
(45) Date of Patent: Oct. 21, 2014

(54) PORTABLE HYDROGEN GENERATOR

(75) Inventor: Joerg Zimmermann, Vancouver (CA)

(73) Assignee: Societe BIC, Clichy (FR)

( * ) Notice: Subject to any disclaimer, the term of this patent is extended or adjusted under 35 U.S.C. 154(b) by 1297 days.

(21) Appl. No.: 12/572,170

(22) Filed: Oct. 1, 2009

(65) Prior Publication Data
US 2010/0080735 A1 Apr. 1, 2010

Related U.S. Application Data

(60) Provisional application No. 61/101,922, filed on Oct. 1, 2008.

(51) Int. Cl.
B01J 7/00 (2006.01)

(52) U.S. Cl.
USPC ............... 48/61; 48/190; 48/191; 48/127.9; 423/657; 423/650; 423/652; 423/648.1; 422/105; 422/108; 422/112

(58) Field of Classification Search
USPC .......... 48/61, 191, 192; 423/657, 650, 652, 423/648.1
See application file for complete search history.

(56) References Cited

U.S. PATENT DOCUMENTS

| 4,211,537 A * | 7/1980 | Teitel .......................... 48/191 |
| 4,391,794 A | 7/1983 | Silberring |
| 5,917,310 A | 6/1999 | Baylis |
| 6,274,093 B1 | 8/2001 | Long et al. |
| 7,101,411 B2 | 9/2006 | Hayashi et al. |
| 7,271,567 B2 * | 9/2007 | Dunn et al. .................... 320/101 |
| 7,708,815 B2 | 5/2010 | Zimmermann |
| 7,891,637 B2 | 2/2011 | Zimmermann et al. |
| 2002/0119355 A1 * | 8/2002 | Shimada et al. ............... 429/20 |
| 2003/0029224 A1 * | 2/2003 | Pratt et al. ..................... 73/23.2 |
| 2004/0219399 A1 * | 11/2004 | Zhu et al. ....................... 429/13 |
| 2005/0164054 A1 * | 7/2005 | Wheat et al. ................... 429/22 |
| 2006/0105210 A1 * | 5/2006 | Surampudi et al. ............ 429/22 |
| 2006/0210841 A1 * | 9/2006 | Wallace et al. ................. 429/12 |
| 2007/0084879 A1 | 4/2007 | McLean et al. |
| 2007/0248851 A1 * | 10/2007 | Wallace et al. ................. 429/13 |
| 2007/0253894 A1 | 11/2007 | Mohajeri et al. |
| 2007/0259220 A1 * | 11/2007 | Redmond ....................... 429/12 |
| 2007/0277436 A1 | 12/2007 | Jones |
| 2007/0292341 A1 | 12/2007 | Kitada |
| 2008/0038617 A1 | 2/2008 | McLean et al. |
| 2008/0057220 A1 * | 3/2008 | Bachrach et al. ............. 427/569 |
| 2008/0075987 A1 | 3/2008 | Kindler |
| 2009/0044346 A1 * | 2/2009 | Koo .................................. 8/159 |
| 2009/0046491 A1 * | 2/2009 | Zacharias et al. ............. 363/134 |
| 2009/0299502 A1 * | 12/2009 | Mankame et al. .............. 700/68 |
| 2010/0050520 A1 * | 3/2010 | Arnold et al. .................. 48/190 |

* cited by examiner

Primary Examiner — Kaity V. Handal
(74) Attorney, Agent, or Firm — The H.T. Than Law Group

(57) ABSTRACT

Portable hydrogen generators are disclosed. In the various embodiments, the generator may include a chamber configured to endothermically decompose a material positioned within the chamber to generate hydrogen gas. A heater may be in thermal communication with the material to stimulate a release of the hydrogen gas. An electrical power source may be controllably coupled to the heater, so that electrical power delivered to the heater may be controlled in response to at least one detected property of the hydrogen gas.

26 Claims, 3 Drawing Sheets

PORTABLE HYDROGEN GENERATOR

CLAIM OF PRIORITY

This patent application claims the benefit of priority of Joerg Zimmermann U.S. Provisional Patent Application Ser. No. 61/101,922, which was filed on Oct. 1, 2008, and which is incorporated herein by reference in its entirety.

BACKGROUND

Electrochemical cells, such as fuel cells, may utilize hydrogen and oxygen as reactants to generate electricity in an electrochemical reaction. While oxygen may be obtained directly from the ambient atmosphere, hydrogen may be provided to the electrochemical cells from a supply system configured to store the hydrogen, and to deliver the hydrogen to the electrochemical cells when required. Accordingly, when the hydrogen in the supply system is depleted, replenishment of the hydrogen may be necessary before further electrical generation may occur.

BRIEF DESCRIPTION OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, various embodiments discussed in the present document.

SUMMARY

Figure 1:
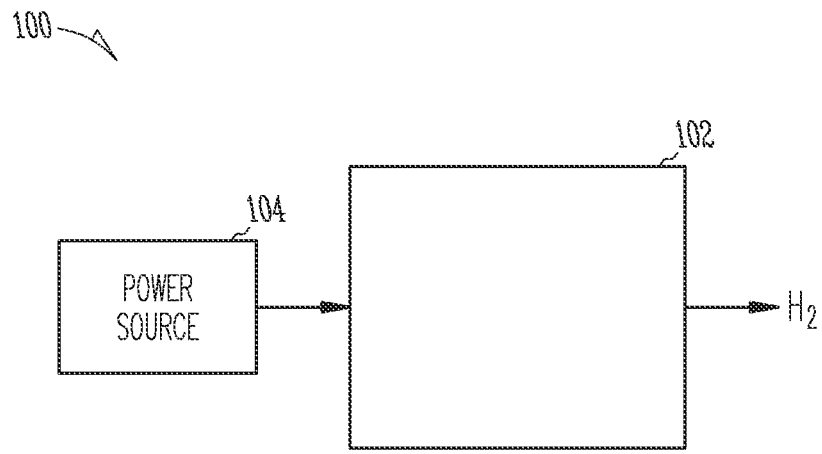
FIG. 1 is a diagrammatic block view of a portable hydrogen generator according to some embodiments of the invention.

Portable hydrogen generators are disclosed. In an aspect, the generator may include a chamber configured to endothermically decompose a material positioned within the chamber to generate hydrogen gas. A heater may be in thermal communication with the material to stimulate a release of the hydrogen gas. An electrical power source may be controllably coupled to the heater, so that electrical power delivered to the heater may be controlled in response to at least one detected property of the hydrogen gas.

DETAILED DESCRIPTION

The following detailed description includes references to the accompanying drawings, which form a part of the detailed description. The drawings show, by way of illustration, various embodiments that may be practiced. These embodiments, which are also referred to herein as "examples," are described in enough detail to enable those skilled in the art to practice the embodiments. The embodiments may be combined, other embodiments may be utilized, or structural, and logical changes may be made without departing from the scope of the various embodiments. The following detailed description is, therefore, not to be taken in a limiting sense, and the scope of the various embodiments is defined by the appended claims and their equivalents.

In this document, the terms "a" or "an" are used to include one or more than one and the term "or" is used to refer to a nonexclusive "or" unless otherwise indicated. In addition, it is understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a portable hydrogen generator in which the generation of hydrogen gas may be controlled by the application of heat. In some embodiments of the invention, the heat may be supplied by a heater powered by an electrical power source. The heater may be configured or programmed to provide heat based on internal or external conditions relative to the generator.

Definitions

As used herein, "electrochemical cell" may refer to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), solid oxide fuel cells (SOFCs), molten carbonate fuel cell (MCFCs), alkaline fuel cells, direct methanol fuel cells, phosphoric acid fuel cells, other suitable fuel cells, and materials thereof.

As used herein, the term "flexible electrochemical layer" (or variants thereof) may include an electrochemical layer that is flexible in whole or in part, that may include, for example, an electrochemical layer having one or more rigid components integrated with one or more flexible components. A "flexible fuel cell layer" may refer to a layer comprising a plurality of fuel cells integrated into the layer.

As used herein, "fluid" refers to a continuous, amorphous substance whose molecules move freely past one another and that has the tendency to assume the shape of its container. A fluid may be a gas, liquefied gas, liquid or liquid under pressure. Examples of fluids may include reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, ammonia, and ammonia derivatives such as amines and hydrazine, silanes such as disilane, trisilane, disilabutane, complex metal hydride compounds such as aluminium borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane, butane, borohydride compounds such as sodium and potassium borohydrides and formic acid.

As used herein, "hydrogen generation material" refers to a component or components that produce hydrogen when activated by a stimulus. In the present context, the hydrogen generation material may be a thermally-activated hydrogen generation material which includes one or more component materials that generate or release hydrogen in response to heat. Such materials may chemically or physically bind hydrogen or may produce hydrogen as a product of a chemical reaction. One or more catalysts may be utilized with such materials to facilitate the generation of hydrogen. Examples of hydrogen-binding materials include metal hydrides, suitable zeolites, and carbon-based reversible hydrogen-storing materials such as suitable carbon nanotubes, carbon fibers, carbon aerogels, and activated carbon. Examples of materials that may produce hydrogen as a product of a chemical reaction include chemical hydrides, hydrocarbon hydrogen carriers, and other suitable hydrogen-containing compounds, such as ammonia, amine boranes, alcohols such as methanol and ethanol, and formic acid. Such materials may produce hydrogen via any suitable reactions including without limitation thermolysis, hydrolysis, reforming, and electrolysis.

As used herein, "hydrogen carrier" may refer to any compound including a hydrogen bond, materials including such compounds, or combinations thereof. Examples of hydrogen carriers include hydrogen, alcohols, such as methanol and ethanol, amines such as ammonia and hydrazine, silanes such as disilane, trisilane, disilabutane, complex compounds such as aluminum borohydride, boranes such as diborane, hydrocarbons such as cyclohexane carbazoles such as dodecahydro-n-ethylcarbazole, and other saturated cyclic, polycyclic hydrocarbons, saturated amino boranes such as cyclotriborazane. Hydrogen carriers can also include saturated hydrocarbons such as cyclohexane and dodecahydro-ethyl carbazole, saturated amino boranes such as cyclotriborazane, carbazoles, and other saturated cyclic hydrocarbons, polycyclic hydrocarbons, aryls, heteroaryls, acyclic hydrocarbons or combinations thereof that can be partially or fully dehydrogenated.

As used herein, "heat-controllable reactions" may refer to reactions that release hydrogen in proportion to a thermal input. In the context of the present discussion, heat-controllable reactions include any reaction or group of reactions that release hydrogen in a net endothermic process. Examples of hydrogen-generating heat-controllable reactions include: active material particles that release hydrogen in response to heat; endothermic thermolysis reactions that release hydrogen, including thermolysis of hydrogen carriers that may include, as non-limiting examples, magnesium-based compounds (e.g., $MgH_2$, $MgAlH_4$, $MgFeH_2$, and others), alinates (e.g., $LiAlH_4$, $NaAlH_4$, and others), $AlH_2$, $CdH_2$, TiH, hydrocarbons, ammonia salts and borazanes.

As used herein, "active material particles" refer to material particles capable of storing hydrogen or other fluids or to material particles that may occlude and desorb hydrogen or another fluid. Active material particles may include fluid-storing materials that occlude fluid, such as hydrogen, by chemisorption, physisorption or a combination thereof. Some hydrogen-storing materials desorb hydrogen in response to stimuli, such as change in temperature, change in heat or a change in pressure. Examples of hydrogen-storing materials that release hydrogen in response to stimuli, include metal hydrides, chemical hydrides, suitable micro-ceramics, nano-ceramics, boron nitride nanotubes, metal organic frameworks, palladium-containing materials, zeolites, silicas, aluminas, graphite, and carbon-based reversible fluid-storing materials such as suitable carbon nanotubes, carbon fibers, carbon aerogels, and activated carbon, nano-structured carbons or any combination thereof. The particles may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof. The active material particles may be formed into a composite hydrogen storage material. Examples of such materials can be found in commonly-owned U.S. patent application Ser. No. 11/379,970, filed Apr. 24, 2006, which is incorporated by reference.

As used herein, "occlude" or "occluding" or "occlusion" refers to absorbing or adsorbing and retaining a substance, such as a fluid. Hydrogen may be a fluid occluded, for example. The fluid may be occluded chemically or physically, such as by chemisorption or physisorption, for example. As used herein, "desorb" or "desorbing" or "desorption" refers to the removal of an absorbed or adsorbed substance. Hydrogen may be removed from active material particles, for example. The hydrogen or other fluid may be bound physically or chemically, for example. As used herein, "contacting" refers to physically, chemically, electrically touching or within sufficiently close proximity. A fluid may contact an enclosure, in which the fluid is physically forced inside the enclosure, for example.

As used herein, "contacting" may refer to physically, chemically, electrically touching or within sufficient close proximity. A fluid may contact an enclosure, in which the fluid is physically forced inside the enclosure, for example.

FIG. 1 is a diagrammatic block view of a portable hydrogen generator 100 according to the various embodiments. The portable hydrogen generator 100 may include a gas generation apparatus 102 that may be configured to evolve hydrogen by controlling an input of electrical power from a power source 104 that is coupled to the gas generation apparatus 102. The electrical power input may be controlled, for example, by the selection of a suitable feedback quantity, such as, without limitation, a pressure, a temperature, a volumetric flow rate, a mass flow rate, or other detectable properties of the evolved hydrogen. The power source 104 may be removably coupled to the gas generation apparatus 102, or it may be an integrated portion of the portable hydrogen generator 100.

In the various embodiments, the portable hydrogen generator 100 may optionally have both an integral power source and a means for removably coupling to an external power source. For example, the power source 104 may include an alternating current (AC) power source, or it may include a direct current (DC) power source. Accordingly, where the power source 104 includes an AC power source, it may include a conventional domestic electrical energy source having a prescribed RMS voltage and frequency. Alternatively, when the power source 104 includes a DC power source, it may further include a prescribed voltage level, such as a voltage level obtainable from one or more storage batteries. In the various embodiments, the portable hydrogen generator 100 may include a DC power source, such as batteries, as well as a means for coupling to an AC power source, such as a wall socket.

The power source 104 may include still other energy conversion devices, such as one or more photovoltaic cells that are operable to provide an electrical current when exposed to a light source. The power source 104 may also include various electromechanical devices. For example, the power source 104 may include a turbine that is coupled to a generation device that is configured to generate an electrical current in response to a motion of a fluid, such as, for example, an ambient air current. The power source 104 may also include other electromechanical energy conversion devices that are configured to convert human-induced locomotion into an electric current. For example, the power source 104 may include a manually-operated generator as disclosed in U.S. Pat. No. 5,917,310 to Baylis, entitled "SPRING OPERATED CURRENT GENERATOR FOR SUPPLYING CONTROLLED ELECTRIC CURRENT TO A LOAD", the disclosure of which is herein incorporated by reference.

In some embodiments, the power source may be an electrochemical cell, such as a battery or a fuel cell. For example, in an embodiment where the portable hydrogen generator is adapted to provide hydrogen to a fuel cell system, the electrical energy to initiate the hydrogen generation reaction may delivered from the fuel cell system that is to be refueled. In such embodiments, the portable hydrogen generator may not need to be plugged into a wall socket to obtain power.

The gas generation apparatus 102 may be configured to include a gas generation chamber (not shown in FIG. 1) for the controllable generation of hydrogen, and a control system (also not shown in FIG. 1) that is operable to receive the feedback quantity from the gas generation chamber and to control the power source 104 so that hydrogen is controllably evolved. The gas generation apparatus 102 may further include a second enclosure, or 'collection chamber' or 'reservoir' for storage of generated hydrogen. The reservoir may be used to accumulate a quantity of hydrogen gas. In some embodiments, the reservoir may include a hydrogen storage material, such as a reversible metal hydride. Suitable gas generation chambers and reservoirs are disclosed in detail in commonly-owned U.S. patent application Ser. No. 11/538,027, entitled "HYDROGEN SUPPLIES AND RELATED METHODS", which application is herein incorporated by reference.

The control system may be configured to utilize a selected control algorithm. In the various embodiments, a suitable control algorithm may include a proportional control mode, wherein a power input to the gas generation apparatus 102 is proportional to an error quantity (e.g., a difference between a set point, or desired value, and a measured value). Other suitable control algorithms may include a derivative control mode, wherein the power input to the apparatus 102 is proportional to a rate of change of the error quantity. Still other suitable control algorithms may include an integral control mode, where the power input is proportional to the integral of the error quantity over a selected period of time. Another suitable control algorithm may include combinations of the foregoing control algorithms, such as a proportional-derivative (PD) mode, a proportional integral (PI) mode, and a proportional-integral-derivative (PID) mode. The selection of a suitable control algorithm may generally depend upon the operational characteristics of the gas generation chamber. With respect to the foregoing description, it is understood that the control system may be suitably implemented using analog circuits, digital circuits, or may be implemented in at least partially in firmware and/or software.

Figure 2:
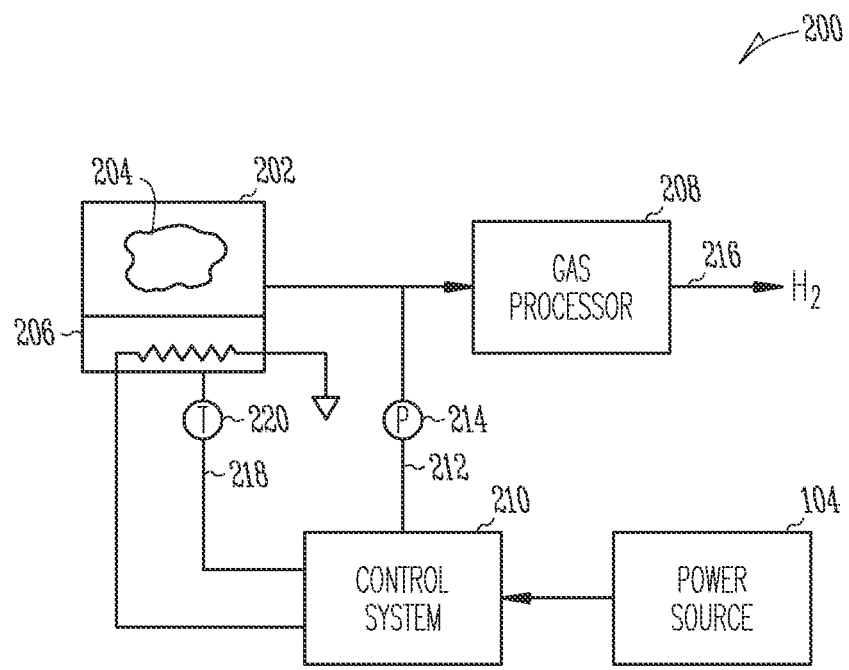
FIG. 2 is a diagrammatic block view of a portable hydrogen generator according to some embodiments of the invention.

FIG. 2 is a diagrammatic block view of a portable hydrogen generator 200 according to various embodiments. The portable hydrogen generator 200 may include a gas generation chamber 202 that is configured to enclose a mass of a suitable hydrogen generation material (or hydrogen carrier) 204, for example, a hydride. The gas generation chamber 202 may also be configured to thermally communicate with a heater 206, which may include a resistive dissipation heater, an inductive heater, a radiative (e.g., an infrared) heater, or other suitable heater devices. The heater 206 may be incorporated into the gas generation chamber 202, or the heater 206 may be a unit that is separate from the gas generation chamber 202, so that the heater 206 and the gas generation chamber 202 are positioned sufficiently adjacent to permit heat to be transferred from the heater 206 to the gas generation chamber 202.

Alternately, in some embodiments, the heater and gas generation chamber may be thermally coupled using an apparatus such as a heat pipe or heat exchanger (not shown). In the various embodiments, the heater 206 may also be positioned within the gas generation chamber 202, or it may be integrated into the hydrogen generation material 204 that is positioned within the gas generation chamber 202.

The portable hydrogen generator 200 may also optionally include a gas processor 208 that is fluidly coupled to the gas generation chamber 202. The gas processor 208 may be configured to process hydrogen received from the gas generation chamber 202. For example, the gas processor 208 may include a filter apparatus configured to remove particulates from the hydrogen evolved from the gas generation material 204 within the gas generation chamber 202, or may include a desiccant to remove water (or water vapor) from the hydrogen produced. The gas processor 208 may also include a gas purification device that is configured to remove one or more undesired gas species that may generated as the hydrogen is evolved. Further examples of gas processors are disclosed in detail in commonly-owned U.S. patent application Ser. No. 11/538,027, entitled "HYDROGEN SUPPLIES AND RELATED METHODS", the disclosure of which is herein incorporated by reference in its entirety.

In some embodiments, the gas processor 208 may be fluidically coupled to a reservoir (not shown in FIG. 2) which may be used to accumulate a quantity of hydrogen gas. Hydrogen gas that is evolved from the gas generation chamber 202 or from the optional gas processor 208 or accumulated in the reservoir may be transferred to a hydrogen gas consumer (not shown in FIG. 2), such as a fuel cell appliance, a fuel cartridge, a portable electronic device including an internal fuel reservoir, or to a storage vessel, through a removable coupling between the gas consumer (not shown) and the portable hydrogen generator 200. Examples of such removable couplings are disclosed in detail in commonly-owned U.S. patent application Ser. No. 11/936,662, filed Nov. 7, 2007, entitled "MAGNETIC FLUID COUPLING ASSEMBLIES AND METHODS" and U.S. patent application Ser. No. 11/535,050, filed Sep. 25, 2006 entitled "METHODS AND APPARATUS FOR REFUELING REVERSIBLE HYDROGEN-STORAGE SYSTEMS", the disclosures of which are incorporated herein in their entirety.

The portable hydrogen generator 200 may also include a control system 210 that is operably coupled to the power source 104, the heater 206 and the gas generation chamber 202. The control system 210 may be configured to receive a pressure signal 212 from a pressure sensor 214 that is suitably positioned to sense a pressure level within the gas generation chamber 202. Optionally, a pressure sensor 214 may be positioned so that it is responsive to a pressure level in the gas processor 208 (if present), or even at an output 216 of the gas processor 208 (if present). The pressure signal 212 may be employed as a feedback quantity for the control system 210. The control system 210 may also be configured to receive a temperature signal 218 that is generated by a thermal sensor 220 in thermal communication with at least one of the heater 206, the gas generation chamber 202 and the hydrogen generation material 204. In the various embodiments, the temperature signal 218 may be used to determine if a predetermined temperature limit has been exceeded. The temperature signal 218 may also be used to determine if the hydrogen generation material 204 is depleted, since absorption of the provided heat by the hydrogen generation material 204 decreases as the material becomes depleted, which may lead to a temperature within the gas generation chamber 202 increasing when a depletion limit is reached. In the various embodiments, a thermostat having an open position and a closed position may be used to detect the depletion limit, where one of the open and closed positions indicates that the limit has been reached.

With reference still to FIG. 2, the operation of the portable hydrogen generator 200 according to some embodiments of the invention will now be described. When hydrogen is to be generated, for example if the hydrogen is to be provided to a fuel cell appliance or to a storage vessel, the control system 210 may electrically couple the power source 104 to the heater 206. Accordingly, the hydrogen generation material 204 within the gas generation chamber 202 is heated, and evolves hydrogen. To modulate hydrogen production from the hydrogen generation material 204, the pressure level within the gas generation chamber may be used to 202 provide a feedback signal to control a power input to the heater 206. As the hydrogen is evolved, it may be directed to a hydrogen consumer through the gas processor 208 (if present) and reservoir (if present, not shown). As the hydrogen generation material 204 approaches a hydrogen depleted state, a pressure within the gas generation chamber 202 may decrease while a temperature within the gas generation chamber 202 may generally increase. Accordingly, in response to the detected decreasing pressure and/or the detected increasing temperature, the control system 210 may interrupt the power transferred from the power source 104 to the heater 206, since the hydrogen generation material 204 may be generally consumed or depleted of hydrogen.

In some embodiments, the hydrogen generation may be initiated through an external input, such as a user controlled 'on-off switch', or in response to the coupling of a hydrogen consumer to the apparatus. For example, a hydrogen generator adapted to provide hydrogen to a fuel cell system may be initiated to generate hydrogen upon connection of the fuel cell system (or a portable electronic device containing a fuel cell system) to the hydrogen generator. In such embodiments, the electrical power to initiate the heater which in turn initiates the hydrogen generation reaction may be provided by the fuel cell system which has been connected to be refueled. In embodiments where the portable electronic device includes a hybrid fuel cell-battery system, electrical power to initiate the heater may be provided by either the fuel cell contained within the portable electronic device, the battery contained within the portable electronic device, or both, in order to initiate generation of hydrogen to be provided to refuel the fuel cell system (or a fuel reservoir within the fuel cell system) contained within the portable electronic device.

Figure 3:
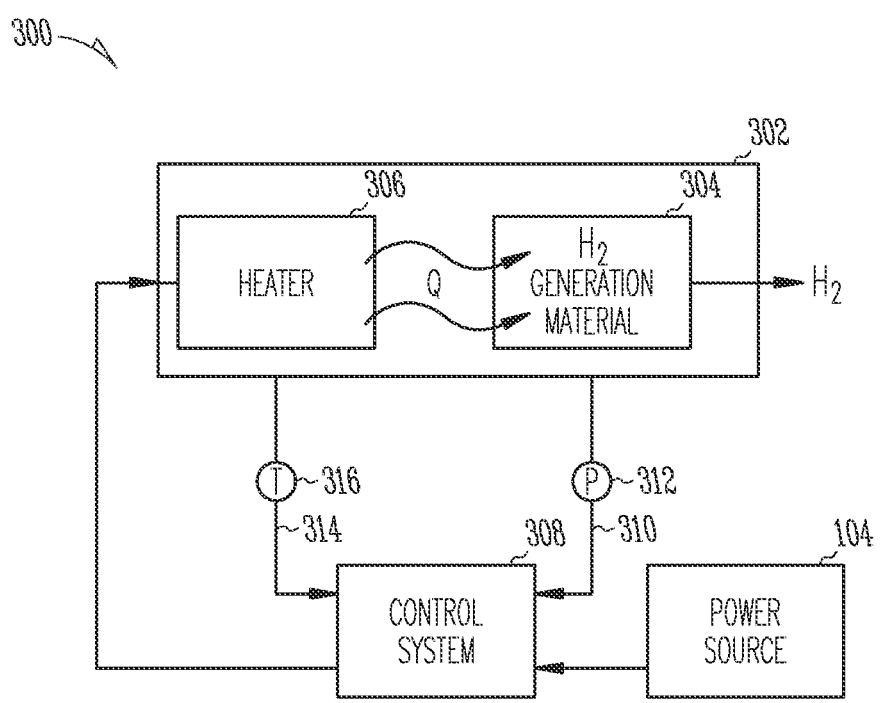
FIG. 3 is a diagrammatic block view of a portable hydrogen generator according to some embodiments of the invention.

FIG. 3 is a diagrammatic block view of a portable hydrogen generator 300 according to various embodiments of the invention. The portable hydrogen generator 300 may include a gas generation chamber 302 that includes a gas generation material 304 that is configured to be heated by a heater 306 positioned within the gas generation chamber 302. The gas generation chamber 302 may optionally be coupled to a control system 308 that is operably coupled to the power source 104; alternately, the power source 104 may be directly coupled to the gas generation chamber 302 and/or the heater 306 contained therein. The control system 308 may also be configured to receive a pressure signal 310 generated by a pressure sensor 312 in response to a sensed pressure level within the gas generation chamber 302, and/or a temperature signal 314 generated by a temperature sensor 316 that is responsive to a sensed temperature within the gas generation chamber 302. As described in detail above, the control system 308 is operable to controllably provide electrical power to the gas generation chamber 302 so that hydrogen may be evolved from the gas generation chamber 302. In the various embodiments, the gas generation chamber 302 may be a unitary assembly that may be removably coupled to the control system 308 so that the gas generation chamber 302 may be conveniently replaced if a component part (e.g., the heater 306) of the gas generation chamber 302 fails.

In some embodiments, all or part of the gas generation chamber (202, 302), may be removably coupled to the portable hydrogen generator (200, 300). In such a way, the hydrogen generation material (204, 304) may be replaced when depleted, either by addition of material, as described below with reference to FIG. 4, or by replacement of the gas generation chamber (202, 302), or a cartridge (not shown) containing fresh hydrogen generation material (204, 304) which may be disposed in the gas generation chamber (202, 302). In other embodiments, it is contemplated that all or part of the gas generation chamber (202, 302) may be integral to an electronic device (e.g. an internal reservoir), and that the electronic device (not shown) may be coupled to the portable hydrogen generator (200, 300).

Figure 4:
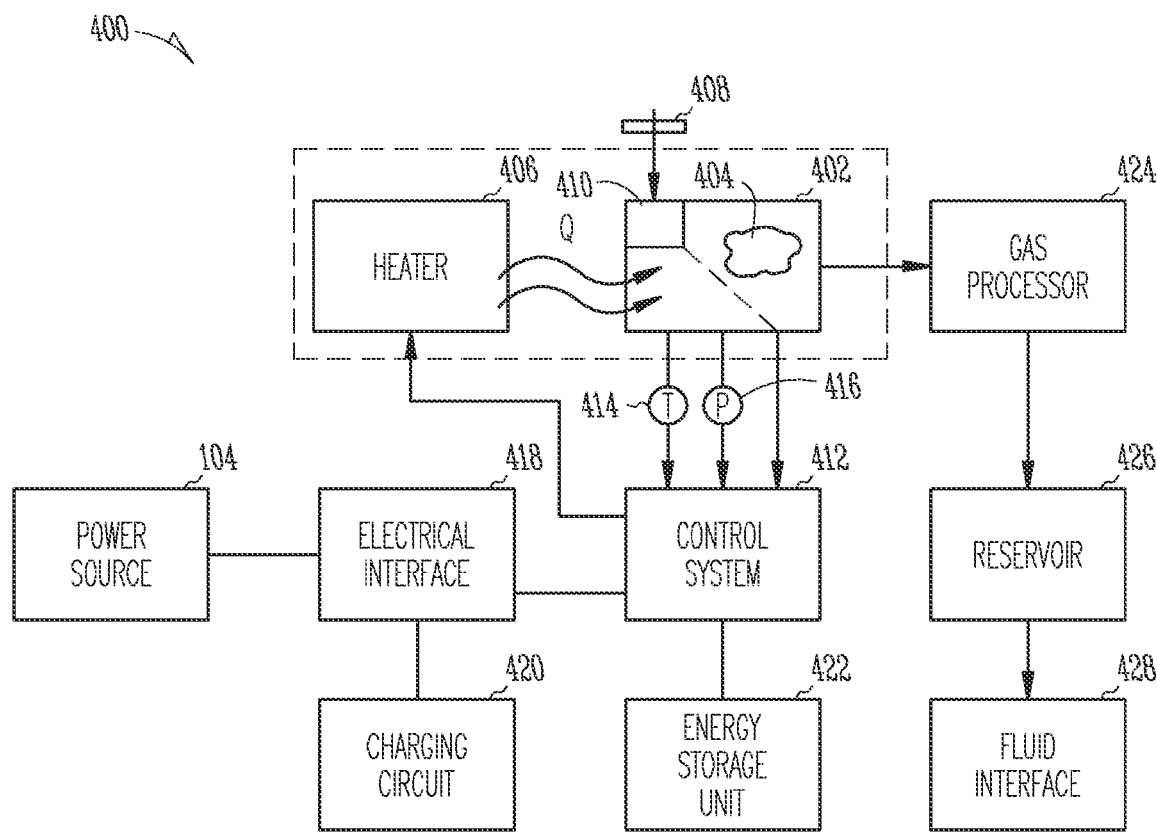
FIG. 4 is a diagrammatic block view of a portable hydrogen generator according to some embodiments of the invention.

FIG. 4 is a diagrammatic block view of a portable hydrogen generator 400 according to various embodiments of the invention. The portable hydrogen generator 400 may include a gas generation chamber 402 that includes a gas generation material 404 that is configured to be heated by a heater 406 positioned proximate to the gas generation chamber 402. The gas generation chamber 402 may include a sealable opening 408 having an open and a closed position that is configured to allow access to the gas generation chamber 402. Accordingly, the gas generation material 404 within the gas generation chamber 402 may be reduced, augmented or replaced. The sealable opening 408 may also be coupled to a positional sensor 410 that is operable to determine if the sealable opening 408 is positioned in the open or the closed position.

The portable hydrogen generator 400 may also include a control system 412 that may be configured to receive temperature and/or pressure signals from a respective temperature sensor 414 and a pressure sensor 416. The control system 412 may also be configured to receive signals from the positional sensor 410, so that the control system 412 may detect the open and closed positions of the sealable opening 408 when the gas generation chamber 402 is accessed. The control system 412 may, for example, prevent operation of the portable hydrogen generator 400 when the sealable opening 408 is in the open position. The control system 412 may also prevent opening of the sealable opening 408 when the portable hydrogen generator 400 is operating, when the pressure within the gas generation chamber 402 is above a certain threshold, or when the temperature within the gas generation chamber 409 is above a certain threshold.

An electrical interface 418 may be positioned between the power source 104 and the control system 412, which may be configured to identify an electrical power source that is coupled to the portable hydrogen generator 400. For example, if the electrical interface 418 detects that an alternating current (AC) source is coupled to the portable hydrogen generator 400, the AC source may also be optionally coupled to a charging circuit 420 that is configured to charge one or more storage batteries located within an optional energy storage unit 422. Accordingly, when an AC source is coupled to the portable hydrogen generator 400, the AC power may be routed through the control system 412 and to the heater 406, while the charging circuit 420 is charging batteries within the energy storage unit 422. In the event that the power source 104 is decoupled from the portable hydrogen generator 400 while the gas generation material 404 in the gas generation chamber 402 is evolving hydrogen, the control system 412 may selectively couple the energy storage unit 422 to the heater 406 to continue the delivery of hydrogen from the portable hydrogen generator 400.

Still referring to FIG. 4, when hydrogen is generated within the gas generation chamber 402, it may be routed to a gas processor 424, which is fluidly coupled to the gas generation chamber 402. The gas processor 424 may include a filter apparatus configured to remove particulates from the hydrogen evolved by the gas generation chamber 402, or it may include a gas purification device that is configured to remove one or more undesired gas species that may generated as the hydrogen is evolved, or it may include a desiccant bed configured to remove water or water vapor from the hydrogen gas stream. An optional reservoir 426 may be fluidly coupled to the gas processor 424 that is configured to retain a volume of the hydrogen received from the gas generation chamber 402. A fluid interface 428 may also be included, which is configured to couple the portable hydrogen generator 400 to an external hydrogen consumer.

As described in detail above, the gas generation chamber 402 may be configured with a sealable opening 408, which may be used to access the gas generation material 404 positioned within the gas generation chamber 402. Accordingly, the gas generation chamber 402 may permit a depleted gas generation material 404 to be removed, and replaced with a non-depleted gas generation material 404. Accordingly, the control system 412 may be configured to interrupt a current to the heater 406 when the control system 412 detects that the gas generation material 404 is depleted. For example, when the control system 412 detects a decreasing pressure, and an increasing temperature within the gas generation chamber 402, current to the heater 406 may be interrupted, and latched to an interrupted state within the control system 412, so that operation of the portable hydrogen generator 400 may not be resumed until the latch is reset from the interrupted state to an operational, or normal state. In addition, an optional indicator light may be illuminated when the control system 412 is latched in the interrupted state in order to provide a visual indication that operation of the portable hydrogen generator has been interrupted. In order to reset the latch, the control system 412 may be configured to detect that the sealable opening 408 is moved to the open position, and then to the closed position, for example, which are actions that generally accompany a replacement of the gas generation material 404 within the gas generation chamber 402. The reset operation may also extinguish the optional indicator light. Although the foregoing discussion described using positions of the sealable opening 408 (as indicated by the positional sensor 410) to reset the latch from the interrupted state to the operational state, it is understood that other detectable conditions may also be used. For example, a level sensor, or a state of charge sensor may also be used to indicate the removal and replacement of the gas generation material 404.

The above description is intended to be illustrative, and not restrictive. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72(b) to allow the reader to quickly ascertain the nature of the technical disclosure. The Abstract is submitted with the understanding that it will not be used to interpret or limit the scope or meaning of the claims.

What is claimed is:

1. A portable hydrogen generator, comprising: a chamber configured to retain an endothermically decomposable hydrogen generation material; a heater in thermal communication with the material; and an electrical power source controllably coupled to the heater, wherein electrical power delivered to the heater is controlled in response to a sensed hydrogen gas temperature, further wherein the electrical power is interrupted when the sensed hydrogen gas temperature rises above a predetermined level, wherein the predetermined level is associated with a depletion of the hydrogen generation material.

2. The portable hydrogen generator of claim 1, wherein the electrical power source is controllably coupled to the heater by a control system responsive to the at least one detected property.

3. The portable hydrogen generator of claim 2, wherein the control system is operably coupled to the chamber to detect at least one of a hydrogen pressure, a hydrogen temperature, a volumetric flow rate of the hydrogen, and a mass flow rate of the hydrogen.

4. The portable hydrogen generator of claim 1, wherein the heater is positioned adjacent to the chamber.

5. The portable hydrogen generator of claim 1, wherein the heater is positioned within the chamber and adjacent to the material.

6. The portable hydrogen generator of claim 1, wherein the heater is positioned within the material that is positioned within the chamber.

7. The portable hydrogen generator of claim 1, wherein the electrical power source is an electrochemical cell.

8. The portable hydrogen generator of claim 7, wherein the electrochemical cell comprises a fuel cell, a battery, or combinations thereof.

9. A portable hydrogen generator, comprising: a chamber configured to retain an endothermically decomposable material; a heater positioned in the thermal communication with the endothermically decomposable material and configured to stimulate a release of hydrogen gas from the material; and a control system responsive to a sensed temperature of the hydrogen gas that controllably couples the heater to an electrical power source wherein the heater is spaced apart from the endothermically decomposable material, wherein the electrical power is interrupted when the sensed hydrogen gas temperature rises above a predetermined level, wherein the predetermined level is associated with a depletion of the endothermically decomposable material.

10. The portable hydrogen generator of claim 9, wherein the chamber is configured to removably retain the endothermically decomposable material.

11. The portable hydrogen generator of claim 10, wherein the chamber includes a sealable opening configured to permit access to the endothermically decomposable material when the material is retained within the chamber.

12. The portable hydrogen generator of claim 11, wherein the sealable opening includes a positional sensor responsive to a position of the sealable opening, further wherein the positional sensor is communicatively coupled to the control system to indicate an exchange of the endothermically decomposable material within the chamber.

13. The portable hydrogen generator of claim 9, wherein the heater comprises a resistive dissipation heater, a radiative heater, an inductive heater, or combinations thereof.

14. The portable hydrogen generator of claim 9, further comprising a gas processor, a gas reservoir, a fluid interface or combinations thereof, and wherein at least one of the gas processor, gas reservoir, or fluid interface is fluidly coupled to the chamber.

15. The portable hydrogen generator of claim 9, comprising an electrical interface configured to be removably coupled to a power source and to the control system to communicate electrical power from the power source to the control system.

16. The portable hydrogen generator of claim 15, wherein the electrical interface is coupled to an energy storage unit that is configured to communicate electrical power to the control system.

17. The portable hydrogen generator of claim 15, wherein the power source is an electrochemical cell.

18. The portable hydrogen generator of claim 17, wherein the electrochemical cell comprises a fuel cell, a battery, or combinations thereof.

19. The portable hydrogen generator of claim 15, wherein the power source is alternating current (A/C) provided by a utility electrical grid.

20. The portable hydrogen generator of claim 9, wherein the heater is located outside the chamber.

21. A portable hydrogen generator, comprising: a chamber configured to retain an endothermically decomposable material that releases hydrogen gas; a heater positioned proximate to the endothermically decomposable material; and a control system wherein the control system is responsive to a sensed temperature of the endothermically decomposable material, further wherein the electrical power is interrupted when said sensed temperature rises above a predetermined level, wherein the predetemiined level is associated with a depletion of the endothermically decomposable material.

22. The portable hydrogen generator of claim 21, wherein the control system includes a control algorithm including one of a proportional control mode, a derivative control mode, an integral control mode, a proportional-derivative (PD) mode, a proportional integral (PI) mode, and a proportional-integral-derivative (PID) mode.

23. The portable hydrogen generator of claim 21, wherein at least one of a gas processor, a gas reservoir and a fluid interface is fluidly coupled to the chamber.

24. The portable hydrogen generator of claim 21, wherein the endothermically decomposable material comprises a hydrogen carrier, wherein the hydrogen carrier releases hydrogen through an endothermic thermolysis reaction.

25. The portable hydrogen generator of claim 21, wherein the endothermically decomposable material comprises a metal hydride.

26. The portable hydrogen generator of claim 21, wherein the control system is coupled to at least one of an alternating current (AC) source and a direct current (DC) source.

* * * * *